United States Patent
Resch et al.

(10) Patent No.: US 9,313,593 B2
(45) Date of Patent: Apr. 12, 2016

(54) RANKING REPRESENTATIVE SEGMENTS IN MEDIA DATA

(75) Inventors: Barbara Resch, Solna (SE); Regunathan Radhakrishnan, Foster City, CA (US); Arijit Biswas, Nuremberg (DE); Jonas Engdegard, Stockholm (SE)

(73) Assignees: Dolby Laboratories Licensing Corporation, San Francisco, CA (US); Dolby International AB, Amsterdam, Zuidoost (NL)

( * ) Notice: Subject to any disclaimer, the term of this patent is extended or adjusted under 35 U.S.C. 154(b) by 0 days.

(21) Appl. No.: 13/997,866

(22) PCT Filed: Dec. 15, 2011

(86) PCT No.: PCT/US2011/065089
§ 371 (c)(1),
(2), (4) Date: Jun. 25, 2013

(87) PCT Pub. No.: WO2012/091938
PCT Pub. Date: Jul. 5, 2012

(65) Prior Publication Data
US 2013/0289756 A1    Oct. 31, 2013

Related U.S. Application Data

(60) Provisional application No. 61/428,578, filed on Dec. 30, 2010, provisional application No. 61/428,588, filed on Dec. 30, 2010, provisional application No. 61/428,554, filed on Dec. 30, 2010, provisional application No. 61/569,591, filed on Dec. 12, 2011.

(51) Int. Cl.
*H04R 29/00* (2006.01)
*G10H 1/00* (2006.01)
(Continued)

(52) U.S. Cl.
CPC ............... *H04R 29/00* (2013.01); *G06F 17/00* (2013.01); *G06F 17/3053* (2013.01); *G10H 1/0008* (2013.01); *G10L 25/48* (2013.01); *G10H 2210/061* (2013.01); *G10H 2240/151* (2013.01)

(58) Field of Classification Search
CPC ......... H04R 29/00; G10L 25/48; G06F 17/00; G06F 17/3053; G06F 17/30787; G10H 1/0008; G10H 2240/151; G10H 2210/061; G10H 2210/00; G10H 2210/036; G10H 2210/041; G06K 9/00744; G06K 9/00758; G06K 9/623; G06K 9/6232
See application file for complete search history.

(56) References Cited

U.S. PATENT DOCUMENTS 4,739,398 A    4/1988 Thomas
6,185,527 B1 *   2/2001 Petkovic et al. .............. 704/231
(Continued)

FOREIGN PATENT DOCUMENTS

CN    101159834    4/2008
EP    1947638    7/2008
(Continued)

OTHER PUBLICATIONS

Alexander Sheh and Daniel P.W. Ellis, "Chord Segmentation and Recognition using EM-Trained Hidden Markov Models", 2003.*

(Continued)

*Primary Examiner* — Curtis Kuntz
*Assistant Examiner* — Qin Zhu

(57) ABSTRACT

Techniques for ranking representative segments in media data are provided. Media features of many different types may be extracted from the media data. A plurality of ranking scores may be assigned to a plurality of candidate representative segments. Each individual candidate representative segment in the plurality of candidate representative segments comprises at least one scene in one or more statistical patterns in media features of the media data based on one or more types of features extractable from the media data. Each individual ranking score in the plurality of ranking scores may be assigned to an individual candidate representative segment in the plurality of candidate representative segments. A representative segment to be played to an end user may be selected from the candidate representative segments, based on the plurality of ranking scores.

30 Claims, 10 Drawing Sheets

(51) Int. Cl.
  *G06F 17/30* (2006.01)
  *G06F 17/00* (2006.01)
  *G10L 25/48* (2013.01)

(56) References Cited

U.S. PATENT DOCUMENTS

| | | | |
|---|---|---|---|
| 6,366,296 B1 | 4/2002 | Boreczky | |
| 7,024,033 B2* | 4/2006 | Li et al. | 382/159 |
| 7,065,544 B2 | 6/2006 | Moreno | |
| 7,179,982 B2 | 2/2007 | Goto | |
| 7,333,864 B1 | 2/2008 | Herley | |
| 7,379,875 B2 | 5/2008 | Burges | |
| 7,409,407 B2 | 8/2008 | Radhakrishnan | |
| 7,831,531 B1* | 11/2010 | Baluja et al. | 706/25 |
| 7,991,770 B2* | 8/2011 | Covell et al. | 707/722 |
| 8,259,806 B2* | 9/2012 | Radhakrishnan et al. | 375/240.15 |
| 8,351,643 B2* | 1/2013 | Radhakrishnan et al. | 382/100 |
| 8,688,248 B2* | 4/2014 | Wang | 700/94 |
| 8,700,641 B2* | 4/2014 | Covell et al. | 707/749 |
| 2002/0028021 A1* | 3/2002 | Foote et al. | 382/224 |
| 2002/0083060 A1 | 6/2002 | Wang | |
| 2003/0101144 A1 | 5/2003 | Moreno | |
| 2003/0120652 A1* | 6/2003 | Tifft | 707/6 |
| 2003/0183064 A1 | 10/2003 | Eugene et al. | |
| 2004/0002973 A1* | 1/2004 | Chaudhuri et al. | 707/7 |
| 2005/0044561 A1 | 2/2005 | McDonald | |
| 2005/0065976 A1 | 3/2005 | Holm | |
| 2005/0091062 A1 | 4/2005 | Burges | |
| 2006/0065102 A1 | 3/2006 | Xu | |
| 2006/0080356 A1 | 4/2006 | Burges | |
| 2006/0212704 A1 | 9/2006 | Kirovski | |
| 2006/0251321 A1 | 11/2006 | Kryeziu | |
| 2006/0276174 A1 | 12/2006 | Katz | |
| 2007/0058949 A1 | 3/2007 | Hamzy | |
| 2007/0192087 A1* | 8/2007 | Kim et al. | 704/200.1 |
| 2007/0294295 A1 | 12/2007 | Finkelstein | |
| 2008/0004878 A1* | 1/2008 | Weng et al. | 704/256 |
| 2008/0104246 A1 | 5/2008 | Katz | |
| 2008/0190267 A1 | 8/2008 | Rechsteiner et al. | |
| 2008/0221895 A1 | 9/2008 | Pauws et al. | |
| 2008/0236371 A1 | 10/2008 | Eronen | |
| 2009/0005890 A1* | 1/2009 | Zhang | 700/94 |
| 2009/0049979 A1 | 2/2009 | Naik et al. | |
| 2009/0132077 A1 | 5/2009 | Fujihara et al. | |
| 2009/0210078 A1* | 8/2009 | Crowley | 700/91 |
| 2009/0228799 A1 | 9/2009 | Verbeeck et al. | |
| 2009/0257649 A1* | 10/2009 | Yamauchi et al. | 382/165 |
| 2009/0277322 A1 | 11/2009 | Cai | |
| 2009/0287323 A1 | 11/2009 | Kobayashi | |
| 2009/0287620 A1* | 11/2009 | Xu | 706/12 |
| 2010/0172591 A1 | 7/2010 | Ishikawa | |
| 2010/0205174 A1* | 8/2010 | Jiang et al. | 707/725 |
| 2011/0000359 A1 | 1/2011 | Yoshida et al. | |
| 2011/0052139 A1* | 3/2011 | Oku | 386/224 |
| 2011/0112672 A1 | 5/2011 | Brown et al. | |
| 2011/0126103 A1 | 5/2011 | Cohen et al. | |
| 2011/0188704 A1* | 8/2011 | Radhakrishnan et al. | 382/100 |
| 2011/0264649 A1* | 10/2011 | Hsiao et al. | 707/722 |
| 2011/0268284 A1* | 11/2011 | Arimoto et al. | 381/56 |
| 2011/0268315 A1* | 11/2011 | Bauer et al. | 382/100 |
| 2012/0029670 A1 | 2/2012 | Mont-Reynaud | |
| 2012/0078894 A1* | 3/2012 | Jiang et al. | 707/723 |
| 2012/0095958 A1 | 4/2012 | Pereira | |
| 2013/0131851 A1* | 5/2013 | Ullrich et al. | 700/94 |
| 2013/0177066 A1 | 7/2013 | Ye | |
| 2013/0287214 A1 | 10/2013 | Resch et al. | |

FOREIGN PATENT DOCUMENTS

| | | |
|---|---|---|
| EP | 2093753 | 8/2009 |
| KR | 10-0766170 | 10/2007 |
| WO | WO 2012091935 A1 * | 7/2012 |
| WO | WO 2012091936 A1 * | 7/2012 |

OTHER PUBLICATIONS

Sellars, "Perceptual Coding: How Mp3 Compression Works". May 2000. pp. 1-5.*

Ong, Bee Suan "Structural Analysis and Segmentation of Music Signals" Jan. 1, 2007, p. 23-24, p. 41-66.

Goto, Masataka, "A Chorus Section Detection Method for Musical Audio Signals and Its Application to a Music Listening Station" IEEE Transactions on Audio, Speech and Language Processing, New York, USA, vol. 14, No. 5, Sep. 1, 2006.

Bergstra, J. et al. "Aggregate Features and Adaboost for Music Classification", Kluwer Academic Publishers—Plenum Publishers, vol. 65, No. 2-3, Jun. 30, 2006, pp. 473-484.

Bartsch, M.A. et al. "Audio Thumbnailing of Popular Music Using Chroma-Based Representations" IEEE Transactions on Multimedia, vol. 7, No. 1, pp. 96-104, published on Feb. 2005.

Tian, A. et al. "Histogram Matching for Music Repetition Detection" Proc. 2009 IEEE International Conference on Multimedia and Expo, Jun. 28-Jul. 3, 2009.

Bartsch, M.A. et al. "To Catch a Chorus: Using Chroma-Based Representations for Audio Thumbnailing" Proc. of the 2001 IEEE Workshop on the Applications of Signal Processing to Audio and Acoustics, Oct. 21-24, 2001, pp. 15-18.

Chat, Wei, "Semantic Segmentation and Summarization of Music: Methods Based on Tonality and Recurrent Structure" IEEE Signal Processing Magazine, vol. 23, No. 2, pp. 124-132, published on Mar. 2006.

Wang, M. et al. "Repeating Pattern Discovery from Acoustic Musical Signals" IEEE International Conference on Multimedia and Expo, published on Dec. 1, 2004.

Peeters, Geoffrey, Deriving Musical Structures from Signal Analysis for Music Audio Summary Generation: "sequence" and "state" approach, Computer Music Modeling and Retrieval. International Symposium. pp. 143-166, volum 2771, 2004.

Schuller, B. et al. "Music Thumbnailing Incorporating Harmony and Rhythm Structure" 6th International Workshop on Adaptive Multimedia Retrieval, published by Springer Verlag on Aug. 2010.

Dannenberg, R.B. et al. "Pattern Discovery Techniques for Music Audio" Journal of New Music Research, vol. 32, No. 2, pp. 153-163, published in Netherlands in Jun. 2003.

Graves, D. et al. "Structural Segmentation of Music with Fuzzy Clustering" Canadian Acoustics, published by Canadian Acoustical Association on Sep. 1, 2008.

Li, X. et al. "A Review on Objective Music Structure Analysis" Proc. of the 2009 International Conference on Information and Multimedia Technology.

Jieping, X. et al. "Music Snippet Extraction via Melody-Based Repeated Pattern Discovery" vol. 52, No. 5, pp. 804-812, published in Germany in May 2009.

Chai, Wei "Structural Analysis of Musical Signals via Pattern Matching" IEEE International Conference on Acoustics, Speech and Signal Processing, 2003.

Koh, Jia-Ling, et al. "Efficient Feature Mining in Music Objects" published by Springer-Verlag, Berlin in Sep. 2001.

Stein, M. et al. "Evaluation and Comparison of Audio Chroma Feature Extraction Methods" AES Convention, May 2009.

Kelly, C. et al. "Structural Segmentation of Irish Traditional Music Using Chroma at Set Accented Tone Locations" AES Convention Oct. 2009.

Harte, C. et al. "Automatic Chord Identification Using a Quantised Chromagram" AES Convention May 2005.

United States Patent and Trademark Office, U.S. Appl. No. 13/995,780, Non-Final Office Action dated Jun. 5, 2015.

United States Patent and Trademark Office, U.S. Appl. No. 13/997,860, Non-Final Office Action dated Aug. 5, 2015.

Internet Archive; https:llweb.archive.org/web/201 00213041408/http://en.wikipedia.org/wiki/FingerprinUcomputing); Fingerprint (Computing); Feb. 2010; pp. 1-3.

* cited by examiner

RANKING REPRESENTATIVE SEGMENTS IN MEDIA DATA

CROSS-REFERENCE TO RELATED UNITED STATES APPLICATIONS

This application claims priority to U.S. Patent Provisional Application Nos. 61/428,578, filed 30 Dec. 2010, 61/428,588, filed 30 Dec. 2010, 61/428,554, filed 30 Dec. 2010, and 61/569,591, filed 12 Dec. 2011, hereby incorporated by reference in each entireties.

TECHNOLOGY

The present invention relates generally to media, and in particular, to ranking representative segments in media data.

BACKGROUND

Media data may comprise representative segments that are capable of making lasting impressions on listeners or viewers. For example, most popular songs follow a specific structure that alternates between a verse section and a chorus section. Usually, the chorus section is the most repeating section in a song and also the "catchy" part of a song. The position of chorus sections typically relates to the underlying song structure, and may be used to facilitate an end-user to browse a song collection.

Thus, on the encoding side, the position of a representative segment such as a chorus section may be identified in media data such as a song, and may be associated with the encoded bitstream of the song as metadata. On the decoding side, the metadata enables the end-user to start the playback at the position of the chorus section. When a collection of media data such as a song collection at a store is being browsed, chorus playback facilitates instant recognition and identification of known songs and fast assessment of liking or disliking for unknown songs in a song collection.

In a "clustering approach" (or a state approach), a song may be segmented into different sections using clustering techniques. The underlying assumption is that the different sections (such as verse, chorus, etc.) of a song share certain properties that discriminate one section from the other sections or other parts of the song.

In a "pattern matching approach" (or a sequence approach), it is assumed that a chorus is a repetitive section in a song. Repetitive sections may be identified by matching different sections of the song with one another.

Both "the clustering approach" and "the pattern matching approach" require computing a distance matrix from an input audio clip. In order to do so, the input audio clip is divided into N frames; features are extracted from each of the frames. Then, a distance is computed between every pair of frames among the total number of pairs formed between any two of the N frames of the input audio clip. The derivation of this matrix is computationally expensive and requires high memory usage, because a distance needs to be computed for each and every one of all the combinations (which means an order of magnitude of N×N times, where N is the number of frames in a song or an input audio clip therein).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1:
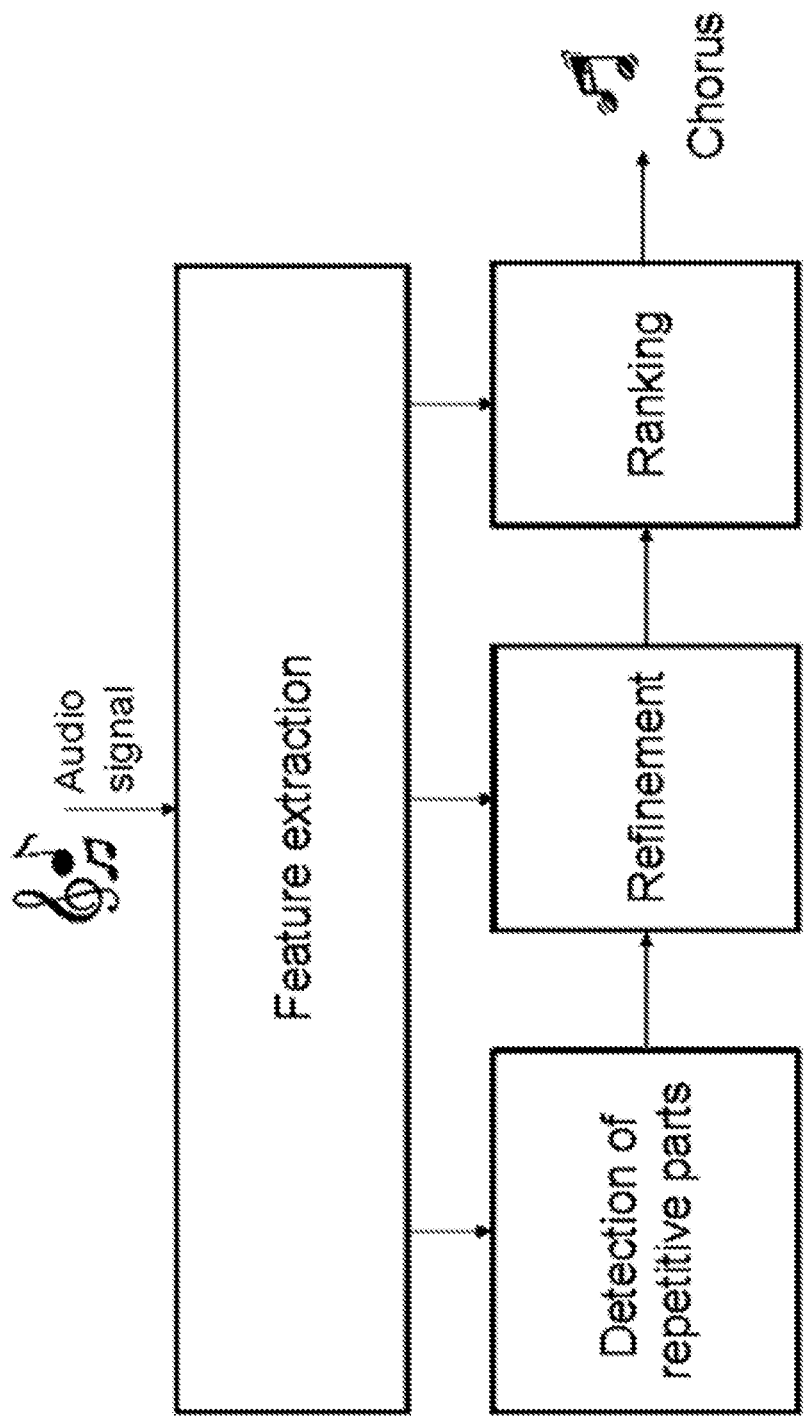
FIG. 1 depicts an example basic block diagram of a media processing system, according to possible embodiments of the present invention.

Example possible embodiments, which relate to ranking representative segments in media data, are described herein. In the following description, for the purposes of explanation, numerous specific details are set forth in order to provide a thorough understanding of the present invention. It will be apparent, however, that the present invention may be practiced without these specific details. In other instances, well known structures and devices are not described in exhaustive detail, in order to avoid unnecessarily including, obscuring, or obfuscating the present invention.

Example embodiments are described herein according to the following outline:

1. GENERAL OVERVIEW
2. FRAMEWORK FOR FEATURE EXTRACTION
3. SPECTRUM BASED FINGERPRINTS
4. CHROMA FEATURES
5. OTHER FEATURES
   5.1 MEL-FREQUENCY CEPSTRAL COEFFICIENTS (MFCC)
   5.2 RHYTHM FEATURES
6. DETECTION OF REPETITIVE PARTS
7. REFINEMENT USING SCENE CHANGE DETECTION
8. RANKING
8.1. RANKING USING WEIGHTED SCORES
8.2. RANKING USING STATISTICAL MODELS
9. OTHER APPLICATIONS
10. EXAMPLE PROCESS FLOW
11. IMPLEMENTATION MECHANISMS—HARDWARE OVERVIEW
12. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

As described herein, media data may comprise, but are not limited to, one or more of: songs, music compositions, scores, recordings, poems, audiovisual works, movies, or multimedia presentations. In various embodiment, the media data may be derived from one or more of: audio files, media database records, network streaming applications, media applets, media applications, media data bitstreams, media data containers, over-the-air broadcast media signals, storage media, cable signals, or satellite signals.

Media features of many different types may be extractable from the media data, capturing structural properties, tonality including harmony and melody, timbre, rhythm, loudness, stereo mix, or a quantity of sound sources of the media data. Features extractable from media data as described herein may relate to any of a multitude of media standards, a tuning system of 12 equal temperaments or a different tuning system other than a tuning system of 12 equal temperaments.

One or more of these types of media features may be used to generate a digital representation for the media data. For example, media features of a type that captures tonality, timbre, or both tonality and timbre of the media data may be extracted, and used to generate a full digital representation, for example, in time domain or frequency domain, for the media data. The full digital representation may comprise a total of N frames. Examples of a digital representation may include, but are not limited to, those of fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

In some embodiments, when multiple candidate representative segments are identified, a representative segment may be selected among the candidate representative segments through ranking. A ranking score may be determined based on one or more types of features extractable from the media data and assigned to each individual candidate representative segment. The ranking score may comprise one or more component ranking scores. A component ranking score may relate to at least one of structural properties, tonality including harmony and melody, timbre, rhythm, loudness, stereo mix, a quantity that represents the number of sound sources of the media data, time position, overlapping by a candidate segment with other candidate segments, repetitions and dynamics related to candidate segments, etc. For example, a first component ranking score in the (composite) ranking score of a candidate representative segment may be assigned based on a first type of media features, while a second component ranking score in the same composite ranking score may be assigned based on a second type of media features. In an example, a component ranking score may be based on one of duration, a measure for overlapping between different candidate representative segments, time-wise positions of candidate representative segments in the media data, chroma distance, MFCC, spectral contrast, spectral centroid, spectral bandwidth, spectral roll-off, spectral flatness, presence of singing voice, absence of singing voice, one or more rhythm patterns, energy, one or more stereo parameters, or perceptual entropy.

In some possible embodiments, each component ranking score may be assigned one in a plurality of weight factors assigned to the plurality of component ranking scores. The weight factors for the component ranking scores may be preset or dynamically configurable. In some possible embodiments, the plurality of weight factors assigned to component ranking score may be set using one or more rules. In some possible embodiments, the plurality of weight factors assigned to component ranking score may be set using a probabilistic learning framework or a probabilistic or statistical model.

In some possible embodiments, the plurality of weight factors assigned to component ranking score may be set as the output of a statistical model based on the features, such as Gaussian mixture models, Hidden Markov models. In some possible embodiments, the plurality of weight factors assigned to component ranking score may be set using a boost algorithm. Under an example "Adaboost" approach, media features extracted from a training set of media segments may form a set of features vectors. A strong classifier may be created based on the set of feature vectors obtained from the training set using an "Adaboost" algorithm. The strong classifier may thereafter be applied to each individual candidate representative segment of the media data, for the purpose of ranking the plurality of candidate representative segments.

In some possible embodiments, the representative segment may correspond to a candidate representative segment with a ranking score that is large in relation to other ranking scores assigned to other candidate representative segments in the plurality of candidate representative segments.

Benefits of the present invention include, but are not limited to, identifying a chorus section, or a brief section that may be suitable for replaying or previewing when a large section of songs is being browsed, a ring tone, etc. To play any of one or more representative segments in media data such as a song, the locations of one or more representative segments in the media, for example, may be encoded by a media generator in a media, data bitstream in the encoding stage. The media data bitstream may then be decoded by a media data player to recover the locations of the representative segments and to play any of the representative segments.

In some possible embodiments, mechanisms as described herein form a part of a media processing system, including but not limited to: a handheld device, game machine, television, laptop computer, netbook computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Framework for Feature Extraction

In some possible embodiments, a media processing system herein may contain four major components as shown in FIG. 1. A feature-extraction component may extract features of various types from media data such as a song. A repetition detection component may find time-wise sections of the media data that are repetitive, for example, based on certain characteristics of the media data such as the melody, harmonies, lyrics, timbre of the song in these sections as represented in the extracted features of the media data.

In some possible embodiments, the repetitive segments may be subjected to a refinement procedure performed by a scene change detection component, which finds the correct start and end time points that delineate segments encompassing selected repetitive sections. These correct start and end time points may comprise beginning and ending scene change points of one or more scenes possessing distinct characteristics in the media data. A pair of a beginning scene change point and an ending scene change point may delineate a candidate representative segment.

A ranking algorithm performed by a ranking component may be applied for the purpose of selecting a representative segment from all the candidate representative segments. In a particular embodiment, the representative segment selected may be the chorus of the song.

In some possible embodiments, a media processing system as described herein may be configured to perform a combination of fingerprint matching and chroma distance analyses. Under the techniques as described herein, the system may operate with high performance at a relatively low complexity to process a large amount of media data. The fingerprint matching enables fast and low-complexity searches for the best matching segments that are repetitive in the media data. In these embodiments, a set of offset values at which repetitions occur is identified. Then, a more accurate chroma distance analysis is applied only at those offsets. Relative to a same time interval of the media data, the chroma distance analysis may be more reliable and accurate than the fingerprint matching analysis but at the expense of higher complexity than that of the fingerprint matching analysis. The advantage of the combined/hybrid approach is that since the chroma distance analysis is only applied to certain offsets in the media data, the computational complexity and memory usage decreases drastically as compared with applying the chroma distance analysis on the whole time duration of the media data.

Figure 2:
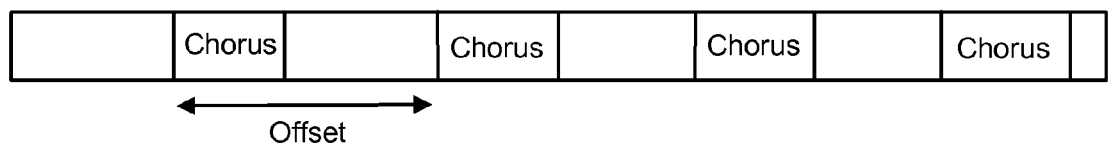
FIG. 2 depicts example media data such as a song having an offset between chorus sections, according to possible embodiments of the present invention.
Figure 3:
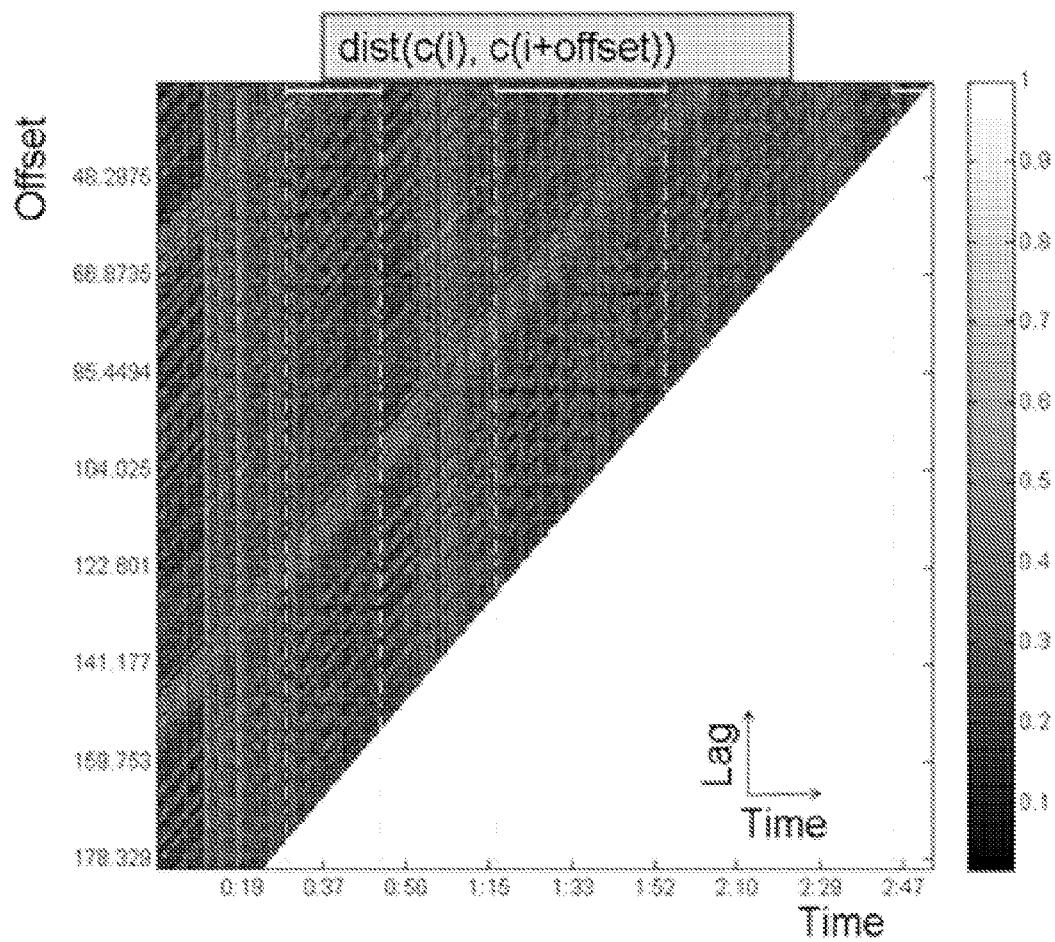
FIG. 3 illustrates an example distance matrix, in accordance with possible embodiments of the present invention.

As mentioned, some repetition detection systems compute a full distance matrix, which contains the distance between each and every one of all combinations formed by any two of all N frames of media data. The computation of the full distance matrix may be computationally expensive and require high memory usage. FIG. 2 depicts example media data such as a song having an offset as shown between the first and second chorus sections. FIG. 3 shows an example distance matrix with two dimensions, time and offset, for distance computation. The offset denotes the time-lag between two frames from which a dissimilarity value (or a distance) relating to a features (or similarity) is computed. Repetitive sections are represented as horizontal dark lines, corresponding to a low distance of a section of successive frames to another section of successive frames that are a certain offset apart.

Under techniques as described herein, the computation of a full distance matrix may be avoided. Instead, fingerprint matching data may be analyzed to provide the approximate locations of repetitions and respective offsets between (neighboring repetitions) approximate locations. Thus, distance computations between features that are separated by an offset value that is not equal to one of the significant offsets can be avoided. In some possible embodiment, the feature comparison at the significant offset values may further be performed on a restricted time range comprising time positions of time points (tm and tq) from fingerprint analysis. As a result, even if a distance matrix is used under techniques as described herein, such a distance matrix may comprise only a few rows and columns for which distances are to be computed, relative to the full distance matrix under other techniques.

3. Spectrum Based Fingerprints

The goal of fingerprint extraction is to create a compact bitstream representation that can serve as an identifier for an underlying section of the media data. In general, for the purpose of detecting malicious tempering of media data, fingerprints may be designed in such a way as to possess robustness against a variety of signal processing/manipulation operations including coding, Dynamic Range Compression (DRC), equalization, etc. However, for the purpose of finding repeating sections in media data as described herein, the robustness requirements of fingerprints may be relaxed, since the matching of the fingerprints occurs within the same song. Malicious attacks that must be dealt with by a typical fingerprinting system may be absent or relatively rare in the media data as described herein.

Furthermore, fingerprint extraction herein may be based on a coarse spectrogram representation. For example, in embodiments in which the media data is an audio signal, the audio signal may be down-mixed to a mono signal and may additionally and/or optionally be down sampled to 16 kHz. In some embodiments, the media data such as the audio signal may be processed into, but is not limited to, a mono signal, and may further be divided into overlapping chunks. A spectrogram may be created from each of the overlapping chunks. A coarse spectrogram may be created by averaging along both time and frequency. The foregoing operation may provide robustness against relatively small changes in the spectrogram along time and frequency. It should be noted that, in some possible embodiments, the coarse spectrogram herein may also be chosen in a way to emphasize certain parts of a spectrum more than other parts of the spectrum.

Figure 4:
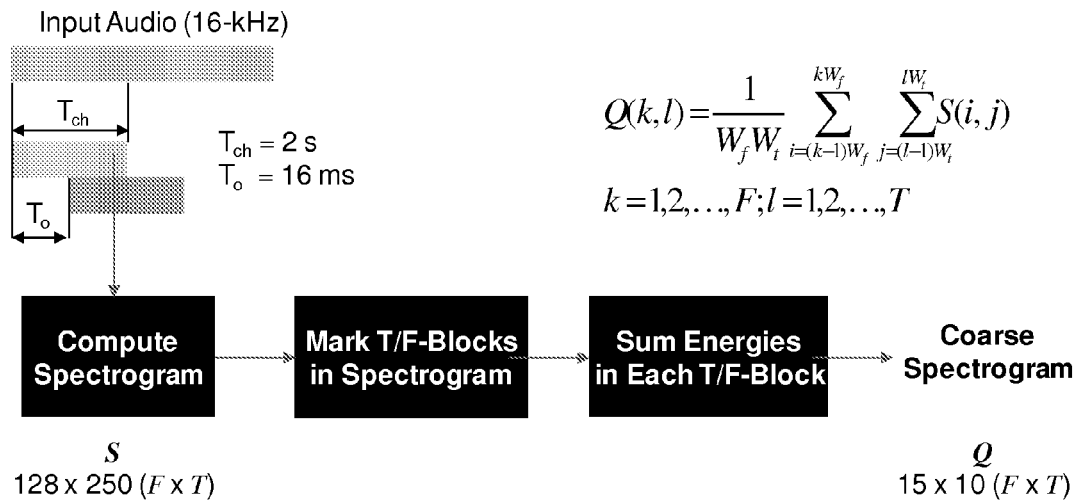
FIG. 4 illustrates example generation of a coarse spectrogram, according to possible embodiments of the present invention.

FIG. 4 illustrates example generation of a coarse spectrogram according to possible embodiments of the present invention. The (input) media data (e.g., a song) is first divided into chunks of duration $T_{ch}=2$ seconds with a step size of $T_o=16$ ms. For each chunk of audio data ($X_{ch}$), a spectrogram may be computed with a certain time resolution (e.g., 128 samples or 8 ms) and frequency resolution (256-sample FFT). The computed spectrogram S may be tiled with time-frequency blocks. The magnitude of the spectrum within each of the time-frequency blocks may be averaged to obtain a coarse representation Q of the spectrogram S. The coarse representation Q of S may be obtained by averaging the magnitude of frequency coefficients in time-frequency blocks of size $W_f \times W_t$. Here, $W_f$ is the size of block along frequency and $W_t$ is the size of block along time. Let F be the number of blocks along frequency axis and T be the number of blocks along time axis and hence Q is of size (F*T). Q may be computed in expression (1) given below:

$$Q(k, l) = \frac{1}{W_f * W_t} \sum_{i=(k-1)W_f}^{kW_f} \sum_{j=(l-1)W_t}^{lW_t} S(i, j)$$

k=1, 2 ... F; l=1, 2 ... T

Here, i and j represent the indices of frequency and time in the spectrogram and k and l represent the indices of the time-frequency blocks in which the averaging operation is performed. In some possible embodiments, F may be a positive integer (e.g., 5, 10, 15, 20, etc.), while T may be a positive integer (e.g., 5, 10, 15, 20, etc.).

In some possible embodiments, a low-dimensional representation of the coarse representation (Q) of spectrogram of the chunk may be created by projecting the spectrogram onto pseudo-random vectors. The pseudo-random vectors may be thought of as basis vectors. A number K of pseudo-random vectors may be generated, each of which may be with the same dimensions as the matrix Q (F×T). The matrix entries may be uniformly distributed random variables in [0, 1]. The state of the random number generator may be set based on a key. Let the pseudo-random vectors be denoted as $P_1, P_2, \ldots, P_K$, each of dimension (F×T). The mean of each matrix $P_i$ may be computed. Each matrix element in $P_i$ (i goes from 1 to K) may be subtracted with the mean of matrix $P_i$. Then, the matrix Q may be projected onto these K random vectors as shown below:

$$H_k = \sum_{i=1}^{M} \sum_{j=1}^{N} Q(i, j) * P_k(i, j)$$

Here $H_k$ is the projection of the matrix Q onto the random vector $P_k$. Using the median of these projections ($H_k$, k=1, 2, ... K) as a threshold, a number K of hash bits for the matrix Q may be generated. For example, a hash bit '1' may be generated for $k^{th}$ hash bit if the projection $H_k$ is greater than the threshold. Otherwise, a hash bit of '0' if not. In some possible embodiments, K may be a positive integer such as 8, 16, 24, 32, etc. In an example, a fingerprint of 24 hash bits as described herein may be created for every 16 ms of audio data. A sequence of fingerprints comprising these 24-bit codewords may be used as an identifier for that particular chunk of audio that the sequence of fingerprints represents. In a possible embodiment, the complexity of fingerprint extraction as described herein may be about 2.58 MIPS.

A coarse representation Q herein has been described as a matrix derived from FFT coefficients. It should be noted that this is for illustration purposes only. Other ways of obtaining a representation in various granularities may be used. For example, different representations derived from fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients, chroma features, or other approaches may be used to derive codewords, hash bits, fingerprints, and sequences of fingerprints for chunks of the media data.

4. Chroma Features

A chromagram may be defined as an n-dimensional chroma vector. For example, for media data in a tuning system of 12 equal temperaments, a chromagram may be defined as a 12-dimensional chroma vector in which each dimension corresponds to the intensity (or alternatively magnitude) of a semitone class (chroma). Different dimensionalities of chroma vectors may be defined for other tuning systems. The chromagram may be obtained by mapping and folding an audio spectrum into a single octave. The chroma vector represents a magnitude distribution over chromas that may be discretized into 12 pitch classes within an octave. Chroma vectors capture melodic and harmonic content of an audio signal and may be less sensitive to changes in timbre than the spectrograms as discussed above in connection with fingerprints that were used for determining repetitive or similar sections.

Figure 5:
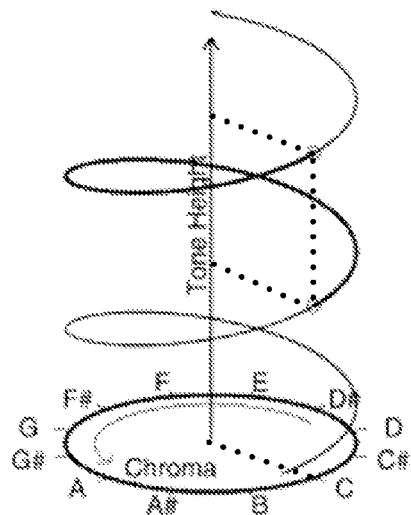
FIG. 5 illustrates an example helix of pitches, according to possible embodiments of the present invention.

Chroma features may be visualized by projecting or folding on a helix of pitches as illustrated in FIG. 5. The term "chroma" refers to the position of a musical pitch within a particular octave; the particular octave may correspond to a cycle of the helix of pitches, as viewed from sideways in FIG. 5. Essentially, a chroma refers to a position on the circumference of the helix as seen from directly above in FIG. 5, without regard to heights of octaves on the helix of FIG. 5. The term "height", on the other hand, refers to a vertical position on the circumference of the helix as seen from the side in FIG. 5. The vertical position as indicated by a specific height corresponds to a position in a specific octave of the specific height.

The presence of a musical note may be associated with the presence of a comb-like pattern in the frequency domain. This pattern may be composed of lobes approximately at the positions corresponding to the multiples of the fundamental frequency of an analyzed tone. These lobes are precisely the information which may be contained in the chroma vectors.

In some possible embodiments, the content of the magnitude spectrum at a specific chroma may be filtered out using a band-pass filter (BPF). The magnitude spectrum may be multiplied with a BPF (e.g., with a Hann window function). The center frequencies of the BPF as well as the width may be determined by the specific chroma and a number of height values. The window of the BPF may be centered at a Shepard's frequency as a function of both chroma and height. An independent variable in the magnitude spectrum may be frequency in Hz, which may be converted to cents (e.g., 100 cents equals to a half-tone). The fact that the width of the BPF is chroma specific stems from the fact that musical notes (or chromas as projected onto a particular octave of the helix of FIG. 5) are not linearly spaced in frequency, but logarithmically. Higher pitched notes (or chromas) are further apart from each other in the spectrum than lower pitched notes, so the frequency intervals between notes at higher octaves are wider than those at lower octaves. While the human ear is able to perceive very small differences in pitch at low frequencies, the human ear is only able to perceive relatively significant changes in pitch at high frequencies. For these reasons related to human perception, the BPF may be selected to be of a relatively wide window and of a relatively large magnitude at relatively high frequencies. Thus, in some possible embodiments, these BPF filters may be perceptually motivated.

A chromagram may be computed by a short-time-fourier-transformation (STFT) with a 4096-sample Hann window. In some possible embodiments, a fast-fourier-transform (PPT) may be used to perform the calculations; a FFT frame may be shifted by 1024 samples, while a discrete time step (e.g., 1 frame shift) may be 46.4 (or simply denoted as 46 herein) milliseconds (ms).

Figure 6:
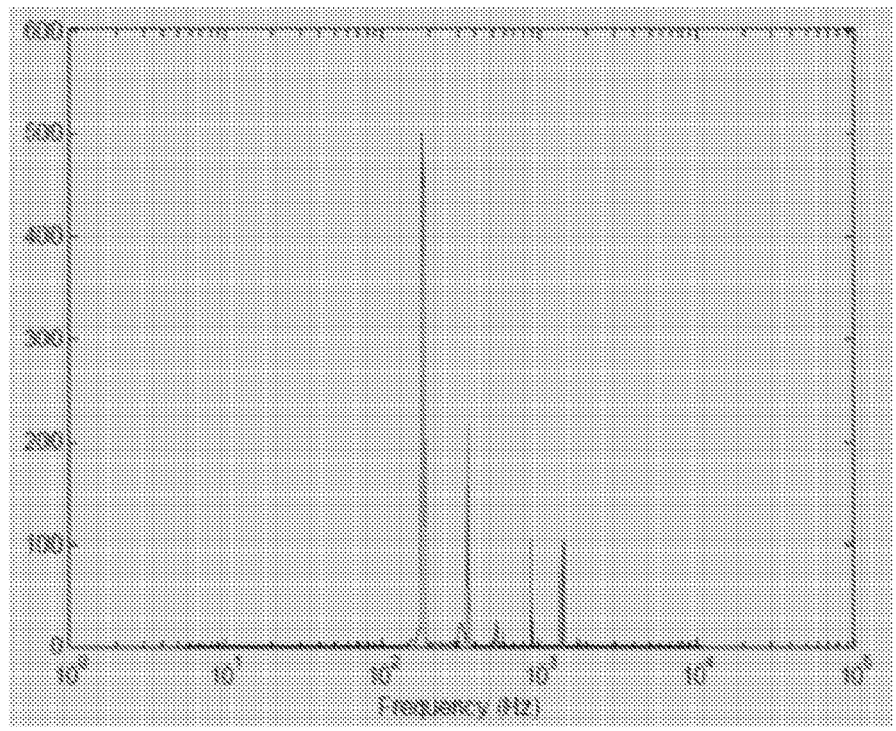
FIG. 6 illustrates an example frequency spectrum, according to possible embodiments of the present invention.
Figure 7:
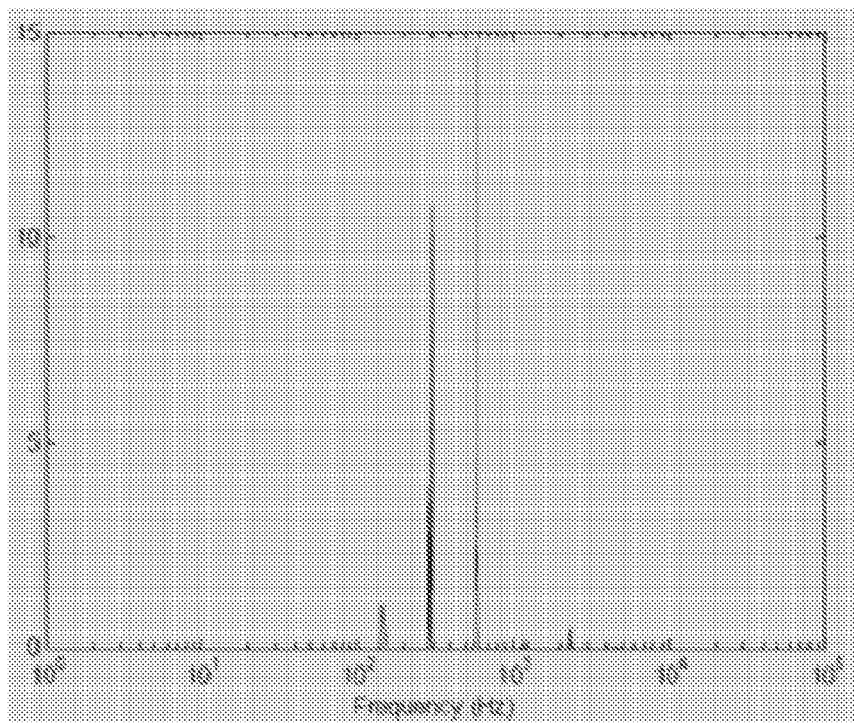
FIG. 7 illustrates an example comb pattern to extract an example chroma, according to possible embodiments of the present invention.

First, the frequency spectrum (as illustrated in FIG. 6) of a 46 ms frame may be computed. Second, the presence of a musical note may be associated with a comb pattern in the frequency spectrum, composed of lobes located at the positions of the various octaves of the given note. The comb pattern may be used to extract, e.g., a chroma D as shown in FIG. 7. The peaks of the comb pattern may be at 147, 294, 588, 1175, 2350, and 4699 Hz.

Figure 8:
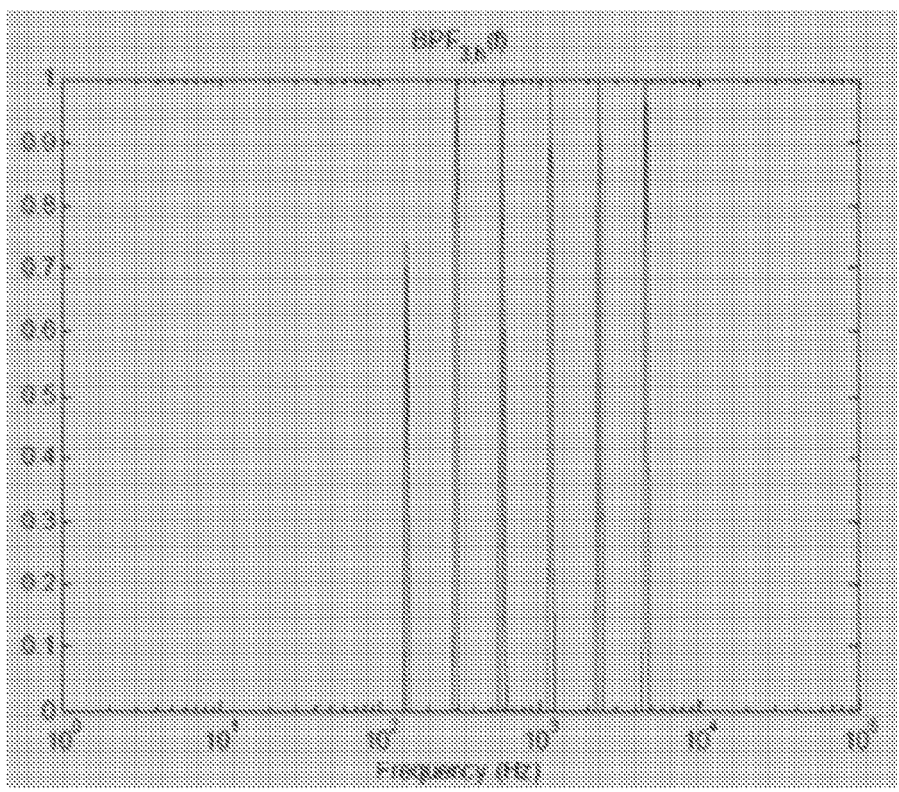
FIG. 8 illustrates an example operation to multiply a frame's spectrum with a comb pattern, according to possible embodiments of the present invention.

Third, to extract the chroma D from a given frame of a song, the frame's spectrum may be multiplied with the above comb pattern. The result of the multiplication is illustrated in FIG. 8, and represents all the spectral content needed for the calculation of the chroma D in the chroma vector of this frame. The magnitude of this element is then simply a summation of the spectrum along the frequency axis.

Fourth, to calculate the remaining 11 chromas the system herein may generate the appropriate comb patterns for each of the chromas, and the same process is repeated on the original spectrum.

In some possible embodiments, a chromagram may be computed using Gaussian weighting (on a log-frequency axis; which may, but is not limited to, be normalized). The Gaussian weighting may be centered at a log-frequency point, denoted as a center frequency "f_ctr", on the log-frequency axis. The center frequency "f_ctr" may be set to a value of ctroct (in units of octaves or cents/1200, with the referential origin at A0), which corresponds to a frequency of 27.5* (2^ctroct) in units of Hz. The Gaussian weighting may be set with a Gaussian half-width of f_sd, which may be set to a value of octwidth in units of octaves. For example, the magnitude of the Gaussian weighting drops to exp(−0.5) at a factor of 2^octwidth above and below the center frequency f_ctr. In other words, in some possible embodiments, instead of using individual perceptually motivated BPFs as previously described, a single Gaussian weighting filter may be used.

Thus, for ctroct=5.0 and octwidth=1.0, the peak of the Gaussian weighting is at 880 Hz, and the weighting falls to approximately 0.6 at 440 Hz and 1760 Hz. In various possible embodiments, the parameters of the Gaussian weighting may be preset, and additionally and/or optionally, configurable by a user manually and/or by a system automatically. In some possible embodiments, a default setting of ctroct=5.1844 (which gives f_ctr=1000 Hz) and octwidth=1 may be present or configured. Thus, the peak of the Gaussian weighting for this example default setting is at 1000 Hz, and the weighting falls to approximately 0.6 at 500 and 2000 Hz.

Figure 9:
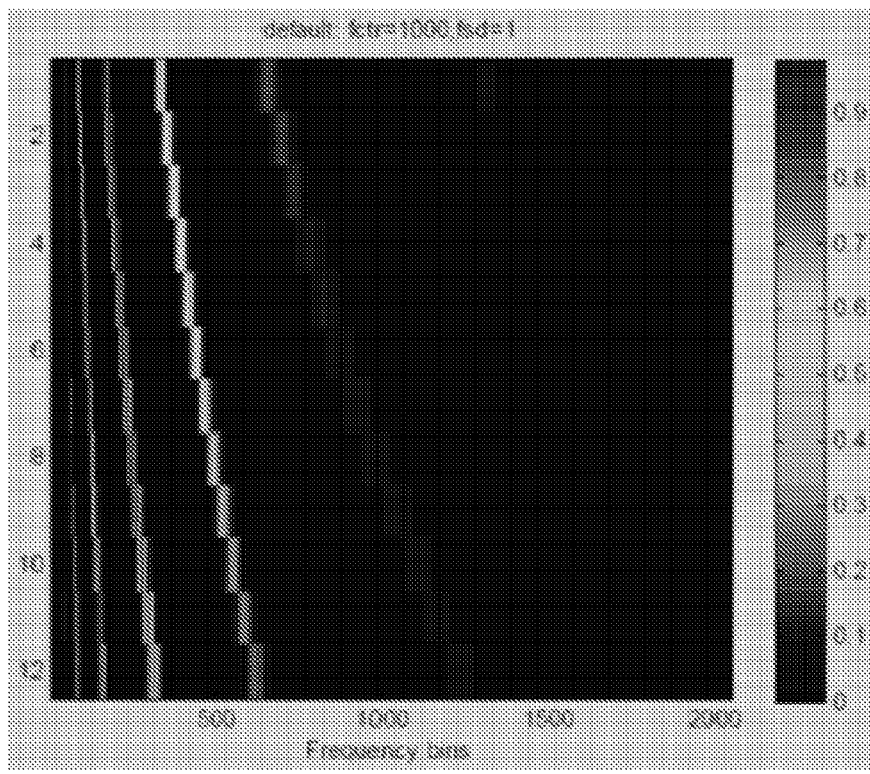
FIG. 9 illustrates a first example weighting matrix relating to a chromagram computed on a restricted frequency range, according to possible embodiments of the present invention.
Figure 10:
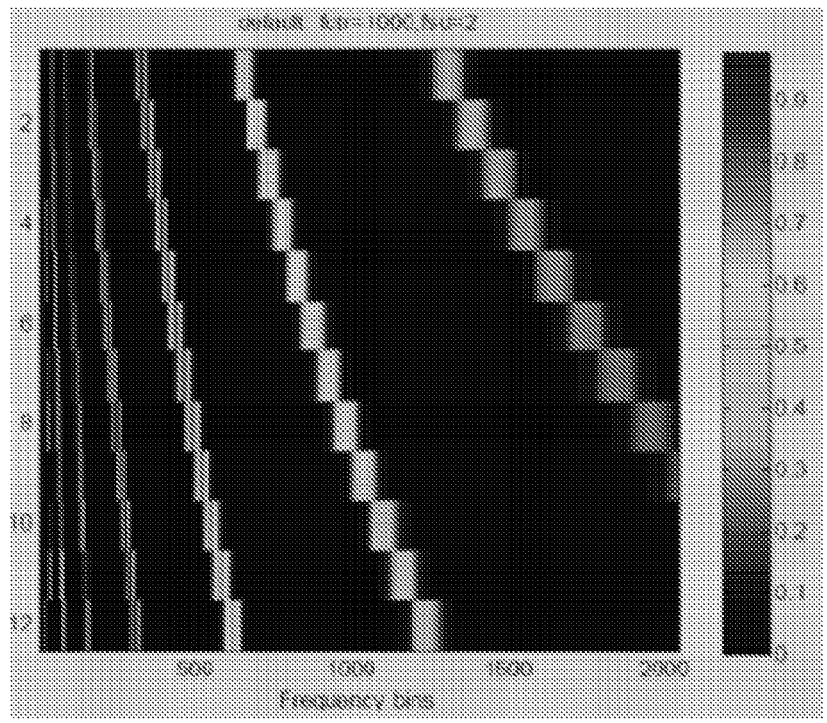
FIG. 10 illustrates a second example weighting matrix relating to a chromagram computed on a restricted frequency range, according to possible embodiments of the present invention.
Figure 11:
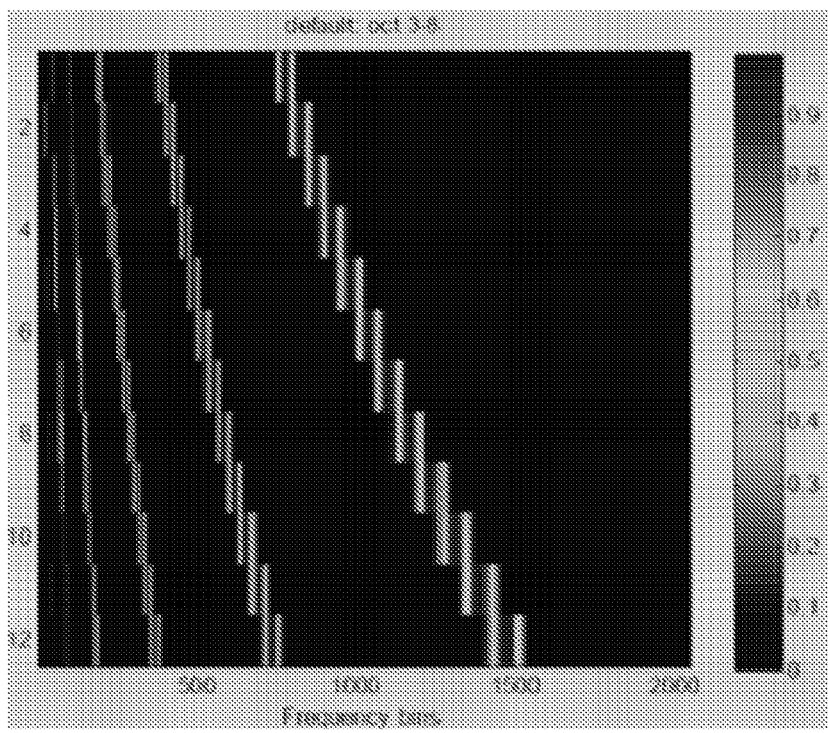
FIG. 11 illustrates a third example weighting matrix relating to a chromagram computed on a restricted frequency range, according to possible embodiments of the present invention.

Thus, in these embodiments, the chromagram herein may be computed on a rather restricted frequency range. This can be seen from the plots of a corresponding weighting matrix as illustrated in FIG. 9. If the f_sd of the Gaussian weighting is increased to 2 in units of octaves, the spread of the weighting for the Gaussian weighting is also increased. The plot of a corresponding weighting matrix looks as shown in FIG. 10. As a comparison, the weighting matrix looks as shown in FIG. 11 when operating with an f_sd having a value of 3 to 8 octaves.

Figure 12:
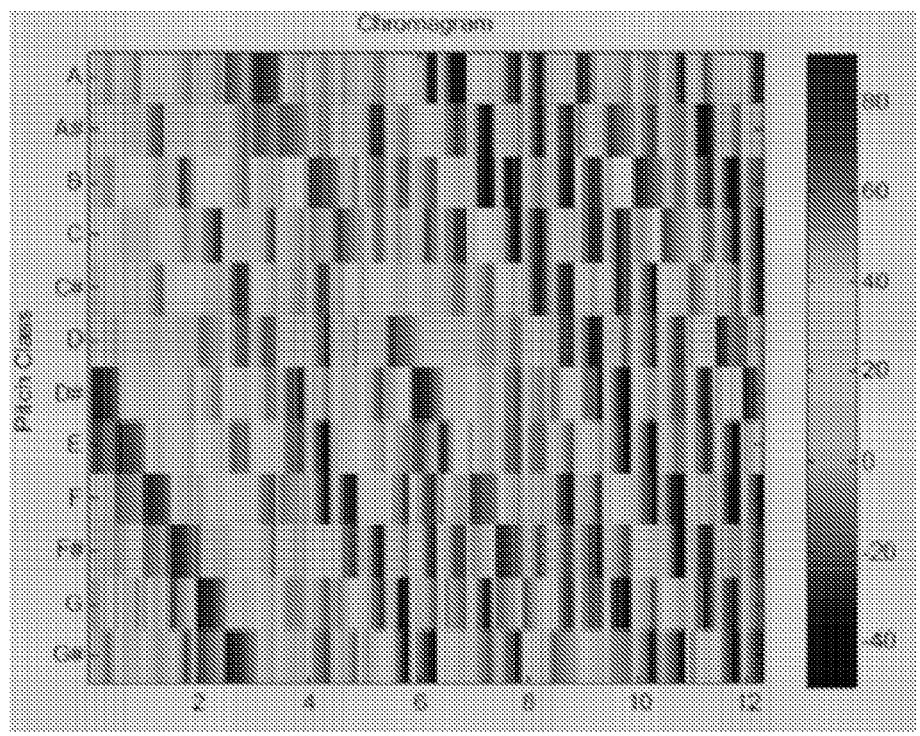
FIG. 12 illustrates an example chromagram plot associated with example media data in the form of a piano signal (with musical notes of gradually increasing octaves) using a perceptually motivated BPF, according to possible embodiments of the present invention.
Figure 13:
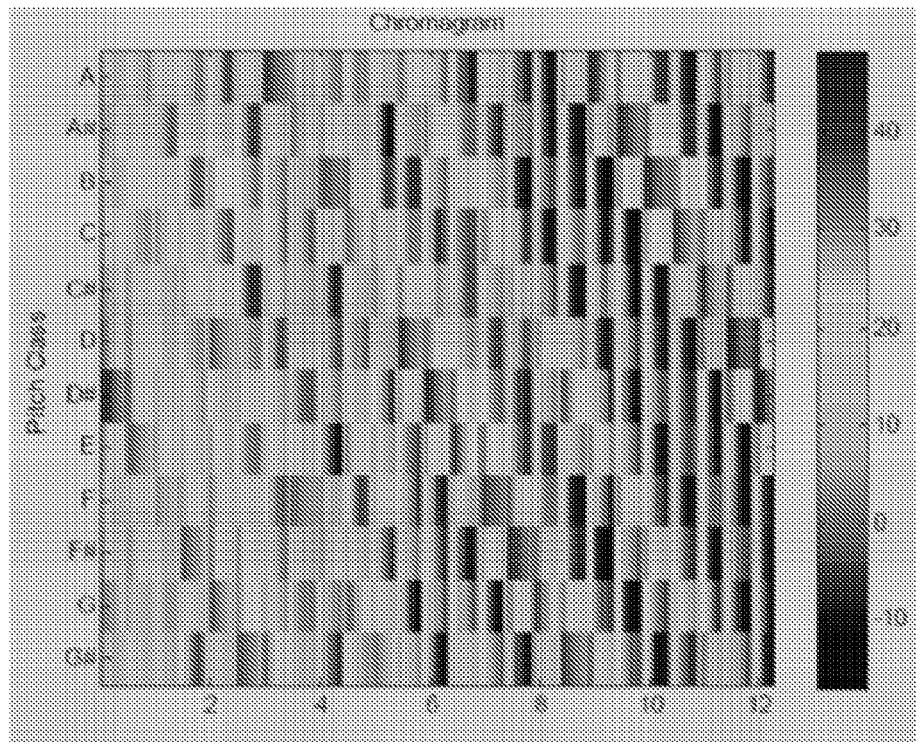
FIG. 13 illustrates an example chromagram plot associated with the piano signal as shown in FIG. 12 but using the Gaussian weighting, according to possible embodiments of the present invention.

FIG. 12 illustrates an example chromagram plot associated with example media data in the form of a piano signal (with musical notes of gradually increasing octaves) using a perceptually motivated BPF. In comparison, FIG. 13 illustrates an example chromagram plot associates with the same piano signal using the Gaussian weighting. The framing and shift is chosen to be exactly same for the purposes of making comparison between the two chromagram plots.

The patterns in both chromagram plots look similar. A perceptually motivated band-pass filter may provide better energy concentration and separation. This is visible for the lower notes, where the notes in the chromagram plot generated by the Gaussian weighting look hazier. While the different BPFs may impact chord recognition applications differently, a perceptually motivated filter brings little added benefits for segment (e.g., chorus) extraction.

In some possible embodiments, the chromagram and fingerprint extraction as described herein may operate on media data in the form of a 16-kHz sampled audio signal. Chromagram may be computed with STFT with a 3200-sample Hann window using FFT. A FFT frame may be shifted by 800 samples with a discrete time step (e.g., 1 frame shift) of 50 ms. It should be noted that other sampled audio signals may be processed by techniques herein. Furthermore, for the purpose of the present invention, a chromagram computed with a different transform, a different filter, a different window function, a different number of samples, a different frame shift, etc. is also within the scope of the present invention.

5. Other Features

Techniques herein may use various features that are extracted from the media data such as MFCC, rhythm features, and energy described in this section. As previously noted, some, or all, of extracted features as described herein may also be applied to scene change detection. Additionally and/or optionally, some, or all, of these features may also be used by the ranking component as described herein.

5.1 Mel-Frequency Cepstral Coefficients (MFCC)

Mel-frequency Cepstral coefficients (MFCCs) aim at providing a compact representation of the spectral envelope of an audio signal. The MFCC features may provide a good description of the timbre and may also be used in musical applications of the techniques as described herein.

5.2 Rhythm Features

Some algorithmic details of computing the rhythmic features may be found in Hollosi, D., Biswas, A., "Complexity Scalable Perceptual Tempo Estimation from HE-AAC Encoded Music," in 128th AES Convention, London, UK, 22-25 May 2010, the entire contents of which is hereby incorporated by reference as if fully set forth herein. In some possible embodiments, perceptual tempo estimation from HE-AAC encoded music may be carried out based on modulation frequency. Techniques herein may include a perceptual tempo correction stage in which rhythmic features are used to correct octave errors. An example procedure for computing the rhythmic features may be described as follows.

In the first step, a power spectrum is calculated; a Mel-Scale transformation is then performed. This step accounts for the non-linear frequency perception of the human auditory system while reducing the number of spectral values to only a few Mel-Bands. Further reduction of the number of bands is achieved by applying a non-linear companding function, such that higher Mel-bands are mapped into single bands under the assumption that most of the rhythm information in the music signal is located in lower frequency regions. This step shares the Mel filter-bank used in the MFCC computation.

In the second step, a modulation spectrum is computed. This step extracts rhythm information from media data as described herein. The rhythm may be indicated by peaks at certain modulation frequencies in the modulation spectrum. In an example embodiment, to compute the modulation spectrum, the companded Mel power spectra may be segmented into time-wise chunks of 6 s length with certain overlap over the time axis. The length of the time-wise chunks may be chosen from a trade-off between costs and benefits involving computational complexity to capture the "long-time rhythmic characteristics" of an audio signal. Subsequently, an FFT may be applied along the time-axis to obtain a joint-frequency (modulation spectrum: x-axis—modulation frequency and y-axis—companded Mel-bands) representation for each 6 s chunk. By weighting the modulation spectrum along the modulation frequency axis with a perceptual weighting function obtained from analysis of large music datasets, very high and very low modulation frequencies may be suppressed (such that meaningful values for the perceptual tempo correction stage may be selected).

In the third step, the rhythmic features may then be extracted from the modulation spectrum. The rhythmic features that may be beneficial for scene-change detection are: rhythm strength, rhythm regularity, and bass-ness. Rhythm strength may be defined as the maximum of the modulation spectrum after summation over companded Mel-bands. Rhythm regularity may be defined as the mean of the modulation spectrum after normalization to one. Bass-ness may be defined as the sum of the values in the two lowest companded Mel-bands with a modulation frequency higher than one (1) Hz.

6. Detection of Repetitive Parts

Figure 14:
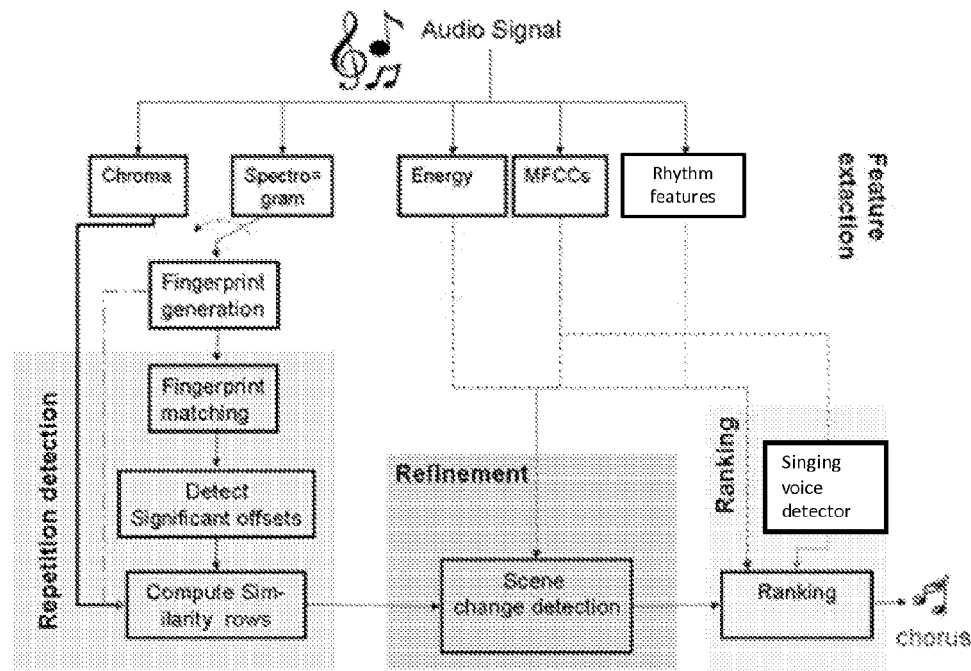
FIG. 14 illustrates an example detailed block diagram of a media processing system, according to possible embodiments of the present invention.
Figure 15:
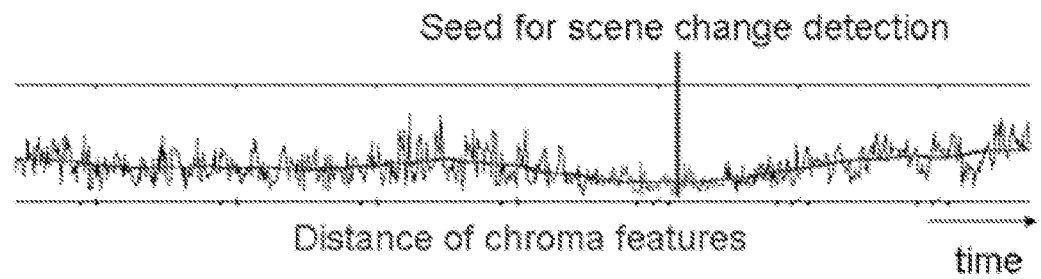
FIG. 15 illustrates example chroma distance values for a row of a similarity matrix, smoothed distance values and resulting seed time point for scene change detection, according to possible embodiments of the present invention.

In some possible embodiments, repetition detection (or detection of repetitive parts) as described herein may be based on both fingerprints and chroma features. FIG. 14 depicts an example detailed block diagram of the system. FIG. 15 shows example chroma distance values for a row of the similarity matrix, the smoothed distance and the resulting seed point for the scene change detection.

7. Refinement Using Scene Change Detection

In some possible embodiments, a position in media data such as a song, after having been identified by a feature distance analysis such as a chroma distance analysis as the most likely inside a candidate representative segment with certain media characteristics may be used as a seed time point for scene change detection. Examples of media characteristics for the candidate representative segment may be repetition characteristics possessed by the candidate representative segment in order for the segment to be considered as a candidate for the chorus of the song; the repetition characteristics, for example, may be determined by the selective computations of the distance matrix as described above.

In some possible embodiments, the scene change detection block of FIG. 14 may be configured in a system herein to identify two scene changes (e.g., in audio) in the vicinity of the seed time point:

a beginning scene change point to the left of the seed time point corresponding to the beginning of the representative segment;

an ending scene change point to the right of the seed time point corresponding to the end of the representative segment.

8. Ranking

The ranking component of FIG. 14 may be given several candidate representative segments for possessing certain media characteristics (e.g., the chorus) as input signals and may select one of the candidate representative segments as the output of the signal, regarded as the representative segment (e.g., a detected chorus section). All candidates representative segments may be defined or delimited by their beginning and ending scene change points (e.g., as a result from the scene change detection described herein).

8.1. Ranking Using Weighted Scores

In some possible embodiments, a rule-based ranking method may be used to select one of the candidate representative segments as the representative segment. In some possible embodiments, features used for ranking in the rule-based ranking method are structural properties, tonality including harmony and melody, timbre, rhythm, loudness, stereo mix, or a quantity of sound sources of the candidate representative segments. Scores may be computed from one or more of these features. For example, a similarity score may be computed for a candidate representative segment as 1 minus the distance. Additionally and/or optionally, an energy score may be computed for the candidate representative segment. In some possible embodiments, both similarity and energy scores may be normalized by the time-wise length of the candidate representative segment, for example, to account for different lengths of different candidate segments. Additionally and/or optionally, a duration score may be defined as $$1 - \left| \log\left(\frac{dur}{27}\right) \right|$$

and may take its maximum value, for example, at a time duration of 27 seconds. The duration score may reach its maximum value at a duration that is typical for the segment to be detected. The score can be computed by using a function that is decreasing as the duration of the detected segment deviates from the typical length. All scores are further normalized to a maximum value of one; and their values may be weighted and added to a total score. In an example, the weighting factors for the features in ranking (e.g., similarity, energy, and duration) may be 3, 1 and 0.2. The candidate representative segment with the highest score may be selected as the representative segment of the media data (e.g., a detected chorus). In a possible embodiment, the scores may be applied in terms of hierarchical conditions in a certain order forming rules. An example for such a rule may be: if a certain score exceeds a certain threshold, then check if another condition is fulfilled, etc.

8.2. Ranking Using Statistical Models

Probabilistic models (Gaussian mixture models, decision trees) can be used to not only obtain the weights, but also to obtain the score directly. In this case no weights for the individual cues are needed. In some possible embodiments, the rule-based ranking method implemented by a system as described herein may use the following three cues are used to a create a total score for each candidate segment:

Cue 1: Representative segments may have certain distinguishable energy characteristics relative to other segments in the media data. For example, a chorus section may be louder than other parts of the song.

Cue 2: Representative segments may have certain distinguishable similarity characteristics relative to other segments in the media data. For example, the chorus segment is the most identically repeating section of the song.

Cue 3: Representative segments may have certain distinguishable duration characteristics relative to other segments in the media data. For example, chorus segments may be between 10 and 35 s. This cue is useful to filter out (or remove from consideration) small repeating sections of music.

The following are some examples of additional cues that may be useful in ranking the candidate representative segments for the purpose of detecting or selecting one or more representative segment with certain media characteristics (e.g., chorus sections).

Cue 4: Representative segments may have certain distinguishable singing voice characteristics relative to other segments in the media data. For instance, a singing voice detector may help rank (e.g., eliminate) candidate representative segments that are repeating but have or do not have any singing voice in them.

Cue 5: Representative segments may have certain distinguishable similarity ratio characteristics relative to other segments in the media data. For instance, chorus segments as clusters have high intra-cluster similarity while having low similarity to rest of the features in the song. A ratio that captures this aspect in the form of a similarity ratio may be computed. The similarity ratio may be the ratio of the similarity of features within the same cluster to the similarity of features to the rest of the song.

Cue 6: Representative segments may have certain distinguishable similarity-to-the-last-loudest-section ratio characteristics relative to other segments in the media data. For example, chorus segments may repeat at the end of a song usually louder. Candidate representative segments can be compared to the loudest section, or a section at the end of the song, or the loudest section from the end section of a song using a similarity measure.

Cue 7: Representative segments may have certain distinguishable time-wise positions characteristics relative to other segments in the media data. For example, chorus segments may be more likely after 25 s. This cue is useful to filter out or to provide a relatively low ranking score to relatively early sections of music.

Cue 8: Representative segments may have more sound sources playing, which can be reflected in a measure as the perceptual entropy or a measure for co-modulation. For example, chorus segments usually have more sound sources playing at the same time whereas during verse sections in a song the singing voice is usually dominant. The number of sound sources mixed in the signal may be indirectly measured by computing perceptual entropy from an audio signal. Perceptual entropy may be calculated from a Signal to Mask Ratio (SMR) parameter derived from a psycho-acoustic analysis.

Cue 9: Representative segments may have certain distinguishable stereo parameters characteristics relative to other segments in the media data. Examples of stereo parameters include but are not limited to: Coherence, Inter-channel Cross-Correlation (ICC), Inter-channel Level Difference (CLD), Inter-channel Phase Difference (IPD), or Channel Prediction Coefficients (CPC). For example, as noted earlier, chorus segments usually have more sound sources (e.g., instruments) playing at the same time and are mixed in such a way that the sound sources produce a wider sound image during chorus sections.

Cue 10: Representative segments may have certain distinguishable rhythm characteristics relative to other segments in the media data. For example, it has been observed that certain rhythm based features such as rhythm strength have discriminative capability or rhythmic patterns to differentiate between a chorus section and verse sections. Such rhythm based features may also be used for ranking the candidate representative segments.

Cue 11: The absolute time position (in seconds) and relative time position (in relation to the song length) is a cue for ranking.

Cue 12: A measure of dynamics of the segment is a cue for ranking. As an example, chorus segments have a more restricted dynamic range, and are commonly louder than verse sections which may vary more dynamically and may be generally less energy.

Other cues: Representative segments may have certain other distinguishable characteristics relative to other segments in the media data. For example, it has been observed that a measure for overlapping between different candidate representative segments, spectral contrast, spectral centroid, spectral bandwidth, spectral roll-off, spectral flatness may be different between a representative segment such as a chorus section and other sections in the media data. These features may alternatively and/or optionally be used for ranking the candidate representative segments.

Some, or all, of these cues may be helpful and included in detecting representative segments from candidate representative segments. For example, some, or all, of these cues may be included in techniques described herein to detect the chorus from the song, or a unique segment from the song. However, the relative significance of each of these may need to be determined. In some possible embodiments, rule-based ranking techniques herein may determine the weights for all cues that are used to rank candidate representative segments.

In some possible embodiments, the weights for these cues (e.g., for top three cues listed if these are cues involved in ranking candidate representative segments) may be chosen heuristically, for example, based on studying empirical results using rule-based ranking techniques herein.

However, as the number of cues that are to be combined in order to detect a representative segment increases, manual tuning of the weights associated with each of the cues may become less tractable.

In order to determine how to combine these different cues, statistical models and machine learning methods can be used. One example for a machine learning method is Adaboost. Statistical models can be used to predict the likelihood of a candidate segment to be representative segment (e.g. chorus segment). These models can be trained on the features extracted from training data. For each segment from the training data a measure of quality can define how well the segment represents a segment with certain characteristics. The statistical model then represents the joint probability density function of the feature space and the quality measure. The model can then be applied on the feature space of a segment during the ranking procedure to predict the quality measure for the given segment.

Examples for statistical models that can be used are Gaussian mixture models (GMMs), Hidden Markov models (HMMs), Support Vector Machines (SVMs).

Another possibility is to use decision and regression trees for ranking that represent a number of rules that are applied in a hierarchical manner to the features. Decision and regression trees can be formulated by machine learning algorithms such as Adaboost.

Ranking Score Based on a Classification Framework

Given a set of labeled training data (chorus/NOT chorus), Adaboost combines the decisions of a set of weak classifiers to arrive at a stronger classifier. Each of the cues may be treated as a feature for a weak-classifier. For instance, a candidate representative segment may be classified as being a chorus segment just based on computed energy score for that candidate representative segment (e.g., if the energy score is greater than a threshold, then the candidate segment is classified as a chorus segment). Such a classifier (also known as decision stump) may not have a high classification accuracy (e.g., >0.85) but the classification accuracy is expected to be at least >0.5. Accordingly, by using Adaboost, a number of such weak classifiers may be combined to obtain a strong classifier with high accuracy. While learning the final strong classifier, Adaboost also may determine the relative significance of each of the weak classifiers (and hence the relative significance of the different cues).

Formally, Adaboost, or the Adaboost learning framework, may be formulated as follows. Given a set of training data with M candidate representative segments consisting of both examples of the representative segments (e.g., chorus sections) and non-representative segments (e.g., non-chorus sections), each candidate representative segment in the training data may be represented with N media features. In some possible embodiments, these N features may be derived based on the cues described earlier. The feature vector derived from candidate representative segment "i" may be represented as $X_i$ (a N-dimensional feature vector, where i=1, 2, ... M). Also, a ground truth label $Y_i$ may be associated with each of the candidate representative segments indicating whether the candidate representative segment is a representative segment (e.g., a chorus section) or a non-representative segment (e.g., a non-chorus section). In an example, $Y_i$=+1 for being a representative segment (e.g., a chorus section); and $Y_i$=−1 for being a non-representative segment (e.g., a non-chorus section).

T weak classifiers may be defined as $h_t$ (where t=1, 2 ... T). Here each $h_t$ maps an input feature vector $(X_i)$ to a predicated label $(Y_{i,t})$. The predicted truth label $Y_{i,t}$ to which the weak classifier $(h_t)$ maps the input feature vector X; matches the ground truth label $Y_i$ at least more than 50% among the M training instances in the training data.

Given the training data, an Adaboost learning algorithm may select T such weak-classifiers and also learn a Set of weights $\alpha_t$ corresponding to each of the weak classifiers. Finally, the strong classifier H(x) may be expressed as in the equation below:

$$H(x) = \text{sign}\left(\sum_{t=1}^{T} \alpha_t h_t(x)\right)$$

Ranking Score Based on a Regression Framework

In some possible embodiments, these N features may be derived based on the cues described earlier. The feature vector derived from candidate representative segment "i" may be represented as $X_i$ (a N-dimensional feature vector, where i=1, 2, ... M). Also, a ground truth score $Y_t$ may be associated with each of the candidate representative segments indicating whether the candidate representative segment is a representative segment (e.g., a chorus section) or a non-representative segment (e.g., a non-chorus section). In the previous example using Adaboost, $Y_i$ represented a discrete label that can take on one of a set of values. For example +1 indicates a chorus segment and −1 indicates as non-chorus segment. Alternatively, as in this case, $Y_t$ may represent a ground truth score which take on any floating point value between 0 and 1. In an example, $Y_i$=0.9 for being a representative segment that has high overlap with a manually labeled chorus section; and $Y_i$=0.1 for being a non-representative segment (it has low overlap with a manually labeled chorus section).

Figure 18:
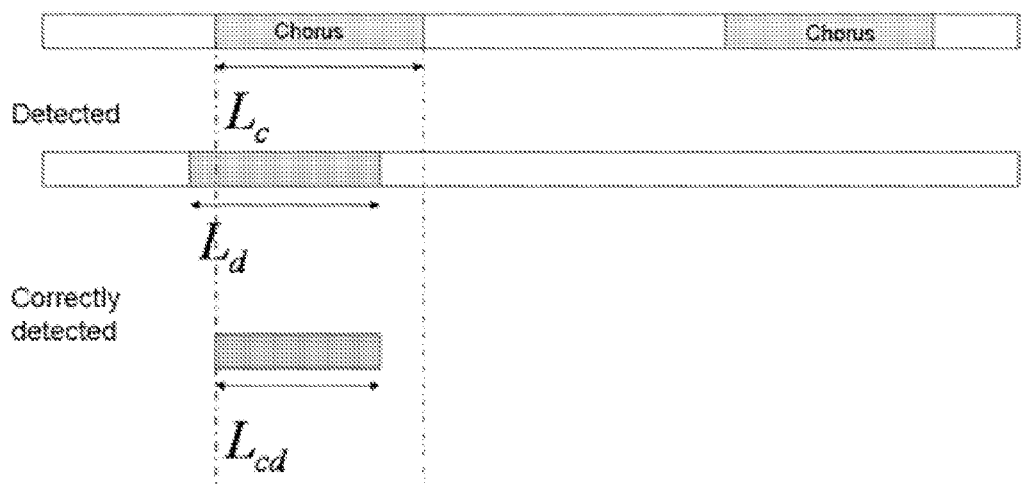
FIG. 18 illustrates example computation of an F-measure, according a possible embodiment of the present invention.

An objective measure called "F-measure" can be used as a ground-truth score. The F-measure corresponds to the amount of overlap of two different segments. For our task it specifies the overlap between the detected chorus segment and the manually labeled chorus segment (serving as ground truth). The F-measure is defined as the geometric mean of the recall rate R and the precision rate P and is determined by the length of the correct segment (corresponding to the manual labeled chorus section) and the detected chorus section (as illustrated in FIG. 18).

$$R = \frac{L_{cd}}{L_c};$$

$$P = \frac{L_{cd}}{L_d}$$

$$F = \frac{2RP}{R+P}$$

The recall rate R denotes the ratio of the correctly detected length to the correct part, thus it reaches its maximum value if the detected segment fully covers the correct segment (and even exceeds it). The precision rate denotes the ratio of the correctly detected segment and the detected segment, thus it reaches its maximum if the detected segment does not exceed the range of the correct segment.

In the previous Adaboost based ranking, given a set of chorus features $X_i=\{x\_1, \ldots x\_f\}$ for each candidate segment i and a set of labels $Y_i=\{+1,-1\}$, we used Adaboost (i) to select a subset of features
(ii) to combine the selected features and obtain a classification decision (score) indicating the likelihood of the candidate segment to be a chorus segment.

The problem with this formulation is that the obtained Adaboost score may not be monotonically related to the F-measure of the candidate segment. For instance, two candidate segments with F_measure=0.75 and 0.95 are considered as positive examples. However, the Adaboost score for the segment with F-measure=0.95 can be lower than that of the other segment.

In order to obtain a monotonic relationship between the ranking score and F-measure, we could use one of the following regression methods instead of the Adaboost classification method.

Given a set of chorus features $X_i=\{X_1, \ldots X_M\}$ for each candidate segment i and a set of output values $Y_i$ belonging to the interval [0,1], we would like to learn a mapping function $G(X_i)$ such that $G(X_i)=Y_i$. Here $Y_i$ is equal to the F-measure of the corresponding candidate segment i.

Method 1: Gaussian Mixture Model (GMM) Based Regression.

1) First model the joint pdf p(X,Y) using a GMM. The parameters of the GMM are learnt from the training data.

2) Then, the mapping function $G(X_i)$ is derived based conditional pdf of Y given X. For a GMM, this can be written as follows:

Let mu_k and sigma_k be the mean and covariance matrix of $k^{th}$ GMM component of p(X,Y). Then, mu_k may be written as {mu_x_k mu_y_k} and sigma_k may be written as [sigma_xx_k sigma_xy_k; sigma_yx_k sigma_yy_k].

Then, the conditional mean of y for $k^{th}$ component may be written as follows:

$$E(y\_k/X_i) = \text{mu\_y\_k} + \text{sigma\_xy\_k} * \text{inv(sigma\_xx\_k)} * (X_i - \text{mu\_x\_k})$$

Let beta_k be the probability that $X_i$ belongs to component k, then the final mapping function $G(X_i)$ is simply the weighted sum as given below:

$$E(y/X\_i) = \text{sum beta\_k} * E(y\_k/X\_i)$$

Method 2: Support Vector Machines (SVM) Based Regression.

Given the training data and a chosen Kernel function K, the SVM based regression method learns a set of parameters such that the loss function between (G(X_i)) and Y_i is minimized.

In particular, the mapping function is of the form:

$$G(X\_i) = (\text{sum}\_\{m=1\} \text{alpha}\_m * K(X\_m, X\_i)) + b$$

Here alpha_m is the parameter of the mapping function in the kernel space. X_m are support vectors. K(X_m, X_i) is the kernel function value evaluated between X_m and input X_i and usually expresses the similarity between X_m and X_i.

One example of the kernel function that is often used is of the form:

$$K(X\_m, X\_i) = \exp(-0.5(X\_m - X\_i)T(X\_m - X\_i)/\text{gamma})$$

Where gamma is a parameter of the kernel.

9. Other Applications

Techniques as described herein may be used to detect chorus segments from music files. However, in general the techniques as described herein are useful in detecting any repeating segment in any audio file.

10. Example Process Flow

Figure 16:
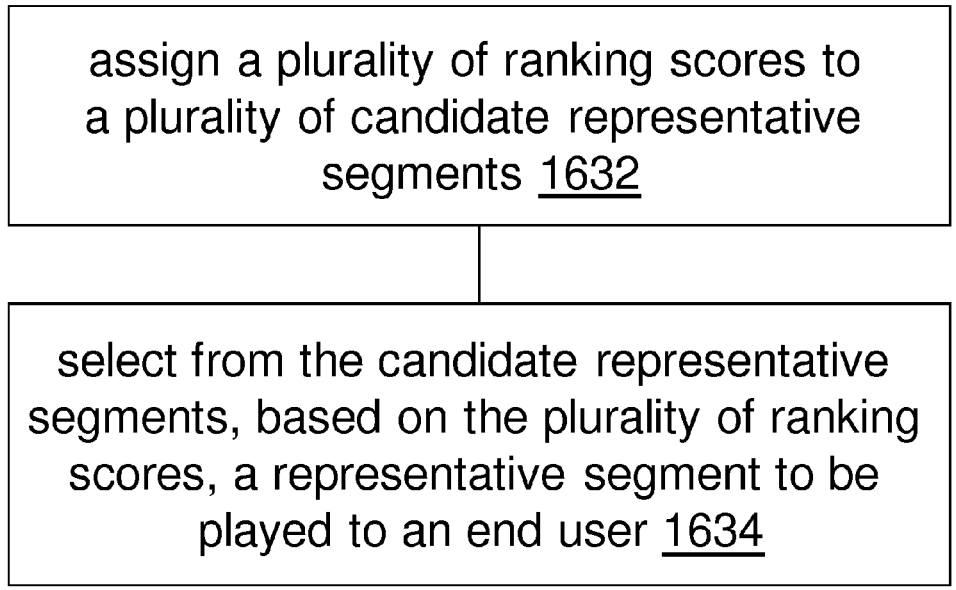
FIG. 16 illustrates an example process flow according to possible embodiments of the present invention.

FIG. 16 illustrates an example process flow according to possible embodiments of the present invention. In some possible embodiments, one or more computing devices or components in a media processing system may perform this process flow. In block 1632, a media processing system assigns a plurality of ranking scores to a plurality of candidate representative segments. Each individual candidate representative segment in the plurality of candidate representative segments comprises at least one scene in one or more statistical patterns in media features of the media data based on one or more types of features extractable from the media data. Each individual ranking score in the plurality of ranking scores may be assigned to an individual candidate representative segment in the plurality of candidate representative segments.

In block 1634, the media processing system selects from the candidate representative segments, based on the plurality of ranking scores, a representative segment to be played to an end user.

In some possible embodiments, each individual ranking score in the plurality of ranking scores comprises one or more component scores; at least one component score in the one or more component scores relates to at least one of structural properties, tonality including harmony and melody, timbre, rhythm, loudness, stereo mix, or a quantity of sound sources of the media data.

In some possible embodiments, each individual ranking score in the plurality of ranking scores comprises at least one component score based on one or more of: duration, a measure for overlapping between different candidate representative segments, time-wise positions of candidate representative segments in the media data, chroma distance, MFCC, spectral contrast, spectral centroid, spectral bandwidth, spectral roll-off, spectral flatness, presence of singing voice, absence of singing voice, one or more rhythm patterns, energy, one or more stereo parameters, or perceptual entropy.

In some possible embodiments, an individual ranking score comprises one or more component scores, each being assigned one in a plurality of weight factors. In some possible embodiments, an individual ranking score is obtained by using a probabilistic learning framework. In some possible embodiments, the probabilistic learning framework is a classification framework (e.g. Adaboost, GMMs, HMMs, SVMs) that is based on training data consisting of examples and discrete labels of the corresponding examples. In some possible embodiments, the probabilistic learning framework is a regression framework (e.g. GMMs, SVMs, Neural Networks, Regression trees) that is based on training data consisting of examples and a continuous objective measure of quality such as the F-measure of the corresponding examples.

In some possible embodiments, an individual ranking score may be obtained based on a probabilistic learning framework. The probabilistic learning framework could be a classification framework that is based on training data consisting of examples and their corresponding discrete labels. For instance, Adaboost is an example of a classification framework. The probabilistic learning framework could be a regression framework that is based on training data consisting of examples and their corresponding continuous objective measure of quality (e.g. F-measure). For instance, GMMs, SVMs, Neural Networks & regression trees can be used for regression.

In some possible embodiments, the media processing system may set the plurality of weight factors using a probabilistic learning framework, e.g., with a boost algorithm. In some possible embodiments, the media processing system may obtain the total score for a segment by applying statistical models, e.g. Gaussian mixture models, Hidden Markov Models.

In some possible embodiments, the media processing system may set the scores for segments using one or more rules. The rules can be formulated as decision and regression trees.

In some possible embodiments, the media processing system may select as the representative segment candidate representative segment with a ranking score that is large in relation to other ranking scores assigned to other candidate representative segments in the plurality of candidate representative segments.

In some possible embodiments, a media processing system may determine a strong classifier based on features extracted from training media segments. The media processing system may create a set of feature vectors by extracting a plurality of features from a training set of media segments. More specifically, each individual feature vector in the set of feature vectors comprises a plurality of features extracted from an individual segment in the plurality of media segment. The media processing system may associate a set of reference truth labels with the training set of media segments. More specifically, each individual segment in the training set of media segments is associated with an individual reference truth label in the set of reference truth labels. The media processing system may calculate a plurality of sets of weak classifiers; each individual set of weak classifier in the plurality of weak classifiers maps the set of features to a set of predicted truth labels. The media processing system may determine a plurality of weights for the plurality of sets of weak classifiers, for example, using a probabilistic learning framework and/or using a boost algorithm such as "Adaboost". Each individual set of weak classifiers in the plurality of sets of weak classifiers is given an individual weight in the plurality of weights. The media processing system may create, based on the plurality of sets of weak classifiers and the plurality of weights, a strong classifier that is to be applied to media data to rank and select a representative segment in a plurality of candidate representative segments. In some possible embodiments, the probabilistic learning framework may be, but is not limited to, either a classification framework or a regression framework.

In some possible embodiments, at least one feature in the plurality of features relates to at least one of: structural properties, tonality including harmony and melody, timbre, rhythm, loudness, stereo mix, or a quantity of sound sources of a segment in the training set.

In some possible embodiments, at least one weak classifier in a set of weak classifiers in the plurality of sets of weak classifiers relates to one or more of: duration, a measure for overlapping between different candidate representative segments, time-wise positions of candidate representative segments in the media data, chroma distance, MFCC, spectral contrast, spectral centroid, spectral bandwidth, spectral rolloff, spectral flatness, presence of singing voice, absence of singing voice, one or more rhythm patterns, energy, one or more stereo parameters, or perceptual entropy.

In some possible embodiments, at least one of the one or more types of features herein is used in part to form a digital representation of the media data. For example, the digital representation of the media data may comprise a fingerprint-based reduced dimension binary representation of the media data.

In some possible embodiments, at least one of the one or more types of features comprises a type of features that captures structural properties, tonality including harmony and melody, timbre, rhythm, loudness, stereo mix, or a quantity of sound sources as related to the media data.

In some possible embodiments, the features extractable from the media data are used to provide one or more digital representations of the media data based on one or more of: chroma, chroma difference, fingerprints, Mel-Frequency Cepstral Coefficient (MFCC), chroma-based fingerprints, rhythm pattern, energy, or other variants.

In some possible embodiments, the features extractable from the media data are used to provide one or more digital representations relates to one or more of: fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

As used herein, the media data may comprise one or more of: songs, music compositions, scores, recordings, poems, audiovisual works, movies, or multimedia presentations. The media data may be derived from one or more of: audio files, media database records, network streaming applications, media applets, media applications, media data bitstreams, media data containers, over-the-air broadcast media signals, storage media, cable signals, or satellite signals.

As used herein, the stereo mix may comprise one or more stereo parameters of the media data. In some possible embodiments, at least one of the one or more stereo parameters relates to: Coherence, Inter-channel Cross-Correlation (ICC), Inter-channel Level Difference (CLD), Inter-channel Phase Difference (IPD), or Channel Prediction Coefficients (CPC).

In some embodiments in which chroma features are used in techniques herein, the chroma features may be extracted using one or more window functions. These window functions may be, but are not limited to: musically motivated, perceptually motivated, etc.

As used herein, the features extractable from the media data may or may not relate to a tuning system of 12 equal temperaments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
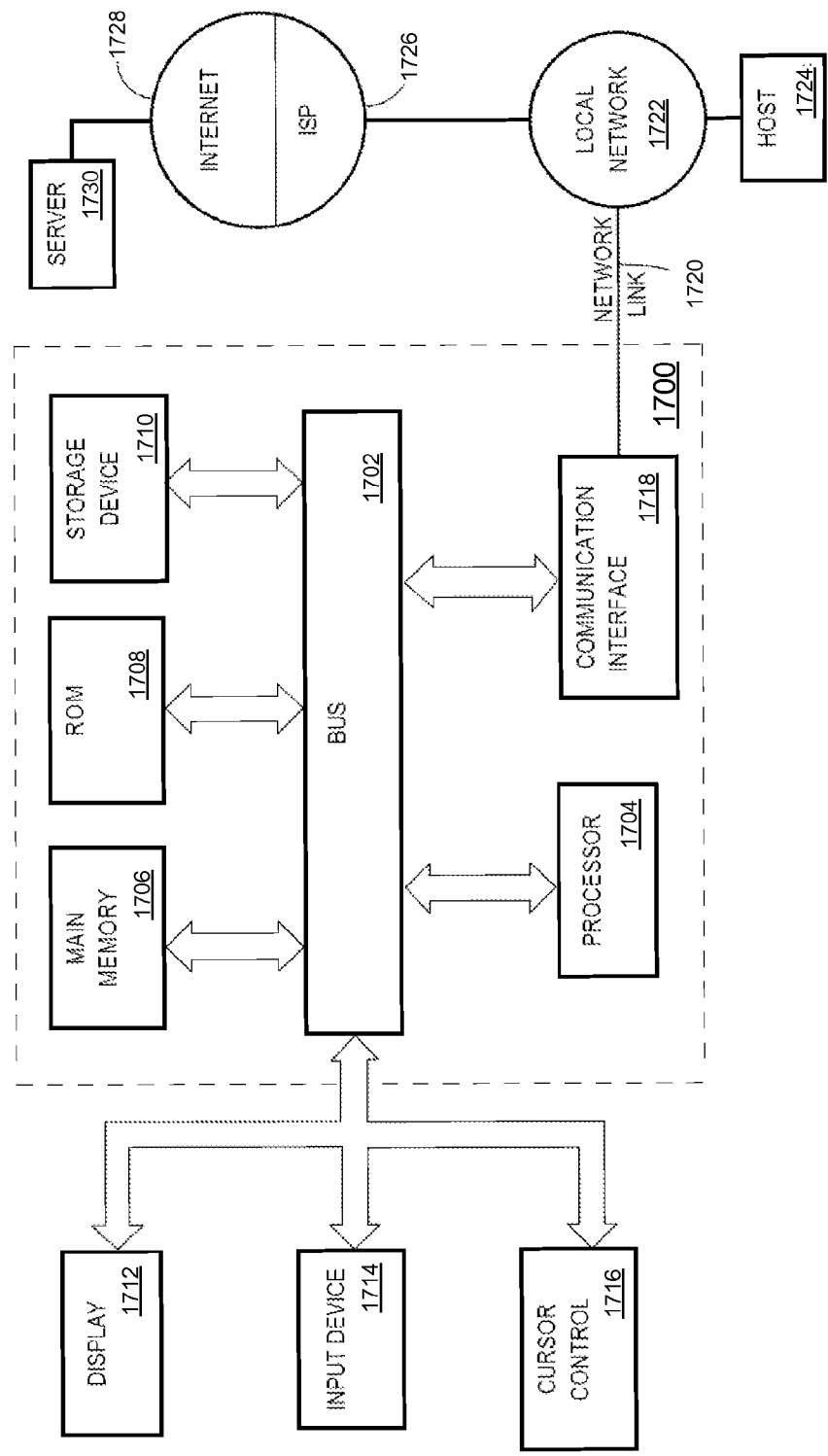
FIG. 17 illustrates an example hardware platform on which a computer or a computing device as described herein may be implemented, according a possible embodiment of the present invention.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712 for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. Computer system 1700 may be used to control the display system.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718. The received code may be executed by processor 1704 as it is received, and/or stored in storage device 1710, or other non-volatile storage for later execution.

12. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for ranking candidate representative segments within media data, comprising:

creating one or more media fingerprints each of which comprises a plurality of hash bits generated from the media data;

extracting features from the media data;

detecting a plurality of scenes within the media data based at least in part on the one or more media fingerprints and a distance analysis for the features extracted from the media data;

assigning a plurality of ranking scores to a plurality of candidate representative segments in the media data, each individual candidate representative segment in the plurality of candidate representative segments comprises at least one scene of the plurality of scenes in the media data, each individual ranking score in the plurality of ranking scores being assigned to an individual candidate representative segment in the plurality of candidate representative segments;

selecting from the plurality of candidate representative segments, based on the plurality of ranking scores, a representative segment;

wherein the method is performed by one or more computing devices.

2. The method of claim 1, wherein each individual ranking score in the plurality of ranking scores comprises one or more component scores, at least one component score in the one or more component scores relates to at least one of structural properties, tonality including harmony and melody, timbre, rhythm, loudness, stereo mix, or a quantity of sound sources of the media data.

3. The method of claim 2, further comprising setting one or more weights for the one or more component ranking scores using one or more rules.

4. The method of claim 1, wherein each individual ranking score in the plurality of ranking scores comprises at least one component score based on one or more of: duration, a measure for overlapping between different candidate representative segments, time-wise positions of candidate representative segments in the media data, chroma distance, MFCC, spectral contrast, spectral centroid, spectral bandwidth, spectral roll-off, spectral flatness, presence of singing voice, absence of singing voice, one or more rhythm patterns, energy, one or more stereo parameters, perceptual entropy, co-modulation, or dynamics.

5. The method of claim 1, wherein an individual ranking score comprises one or more component scores, each being assigned a weight factor in a plurality of weight factors.

6. The method of claim 1, wherein an individual ranking score is obtained by using a probabilistic learning framework.

7. The method of claim 5, further comprising setting the plurality of weight factors using a probabilistic learning framework.

8. The method of claim 5, further comprising setting the plurality of weight factors using at least one statistical model.

9. The method of claim 5, further comprising setting the plurality of weight factors using one or more rules.

10. The method of claim 5, further comprising setting the plurality of weight factors using a boost algorithm.

11. The method of claim 1, wherein the representative segment corresponds to a candidate representative segment with a ranking score that is large in relation to other ranking scores assigned to other candidate representative segments in the plurality of candidate representative segments.

12. The method of claim 1, wherein the features extracted from the media data are used to provide one or more digital representations of the media data based on one or more of: chroma, chroma difference, fingerprints, Mel-Frequency Cepstral Coefficient (MFCC), chroma-based fingerprints, rhythm pattern, energy, or other variants.

13. The method of claim 1, wherein the features extracted from the media data are used to provide one or more digital representations relates to one or more of: fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

14. The method of claim 1, further comprising deriving the media data from one or more of: audio files, media database records, network streaming applications, media applets, media applications, media data bitstreams, media data containers, over-the-air broadcast media signals, storage media, cable signals, or satellite signals.

15. The method of claim 1, wherein the features extracted from the media data relate to a tuning system of 12 equal temperaments.

16. A non-transitory computer readable storage medium, comprising a set of instructions, which when executed by a processing or computing device cause, control or program the device to execute or perform a process, wherein the process comprises the steps of:
creating one or more media fingerprints each of which comprises a plurality of hash bits generated from media data;
extracting features from the media data;
detecting a plurality of scenes within the media data based at least in part on the one or more media fingerprints and a distance analysis for the features extracted from the media data;
assigning a plurality of ranking scores to a plurality of candidate representative segments in the media data, each individual candidate representative segment in the plurality of candidate representative segments comprises at least one scene of the plurality of scenes in the media data, each individual ranking score in the plurality of ranking scores being assigned to an individual candidate representative segment in the plurality of candidate representative segments;
selecting from the plurality of candidate representative segments, based on the plurality of ranking scores, a representative segment.

17. The non-transitory computer readable storage medium of claim 16, wherein each individual ranking score in the plurality of ranking scores comprises one or more component scores, at least one component score in the one or more component scores relates to at least one of structural properties, tonality including harmony and melody, timbre, rhythm, loudness, stereo mix, or a quantity of sound sources of the media data.

18. The non-transitory computer readable storage medium of claim 17, wherein the process further comprises setting one or more weights for the one or more component ranking scores using one or more rules.

19. The non-transitory computer readable storage medium of claim 16, wherein each individual ranking score in the plurality of ranking scores comprises at least one component score based on one or more of: duration, a measure for overlapping between different candidate representative segments, time-wise positions of candidate representative segments in the media data, chroma distance, MFCC, spectral contrast, spectral centroid, spectral bandwidth, spectral roll-off, spectral flatness, presence of singing voice, absence of singing voice, one or more rhythm patterns, energy, one or more stereo parameters, perceptual entropy, co-modulation, or dynamics.

20. The non-transitory computer readable storage medium of claim 16, wherein an individual ranking score comprises one or more component scores, each being assigned a weight factor in a plurality of weight factors.

21. The non-transitory computer readable storage medium of claim 16, wherein an individual ranking score is obtained by using a probabilistic learning framework.

22. The non-transitory computer readable storage medium of claim 20, wherein the process further comprises setting the plurality of weight factors using a probabilistic learning framework.

23. The non-transitory computer readable storage medium of claim 20, wherein the process further comprises setting the plurality of weight factors using at least one statistical model.

24. The non-transitory computer readable storage medium of claim 20, wherein the process further comprises setting the plurality of weight factors using one or more rules.

25. The non-transitory computer readable storage medium of claim 20, wherein the process further comprises setting the plurality of weight factors using a boost algorithm.

26. The non-transitory computer readable storage medium of claim 16, wherein the representative segment corresponds to a candidate representative segment with a ranking score that is large in relation to other ranking scores assigned to other candidate representative segments in the plurality of candidate representative segments.

27. The non-transitory computer readable storage medium of claim 16, wherein the features extracted from the media data are used to provide one or more digital representations of the media data based on one or more of: chroma, chroma difference, fingerprints, Mel-Frequency Cepstral Coefficient (MFCC), chroma-based fingerprints, rhythm pattern, energy, or other variants.

28. The non-transitory computer readable storage medium of claim 16, wherein the features extracted from the media data are used to provide one or more digital representations relates to one or more of: fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

29. The non-transitory computer readable storage medium of claim 16, wherein the process further comprises deriving the media data from one or more of: audio files, media database records, network streaming applications, media applets, media applications, media data bitstreams, media data containers, over-the-air broadcast media signals, storage media, cable signals, or satellite signals.

30. The non-transitory computer readable storage medium of claim 16, wherein the features extracted from the media data relate to a tuning system of 12 equal temperaments.

* * * * *